UNITED STATES PATENT OFFICE.

CHARLES N. WAITE, OF NEWTON, MASSACHUSETTS.

ART OF MANUFACTURING CHLORINE OR CAUSTIC ALKALI BY ELECTROLYSIS.

SPECIFICATION forming part of Letters Patent No. 501,121, dated July 11, 1893.

Application filed December 10, 1891. Serial No. 414,553. (No specimens.)

*To all whom it may concern:*

Be it known that I, CHARLES N. WAITE, a citizen of the United States, residing at Newton, in the county of Middlesex and State of Massachusetts, have invented certain new and useful Improvements in the Art of Manufacturing Chlorine or Caustic Alkali by Electrolysis, of which the following is a specification.

The production of chlorine and caustic alkali from brine by subjecting the brine to the action of an electric current is well-known. It has been found in the practice of this method of manufacture that a considerable proportion of the electric current is not utilized in the production of chlorine and alkali and a waste of the current occurs which is undesirable. The cause of this loss of the current has hitherto, so far as is known to me, been unknown.

The object of my invention is an improvement in the art, by which this loss of current may be avoided and the expense of the manufacture reduced, and it consists in the method hereinafter more fully set forth and which is particularly pointed out in the claim which is appended hereto and made a part hereof.

The brine is used in the manufacture of chlorine and caustic alkali by electrolysis is not chemically pure but contains a small quantity of sulphuric acid, the quantity varying somewhat but being usually only a trace. This trace of sulphuric acid I render inert by adding to the solution of commercial alkaline chloride an excess of, preferably, barium chloride which forms with the sulphuric acid an insoluble precipitate. This is done before the brine is subjected to the electrical current. The precipitate is inert and does not interfere with the action of the current on the brine and so need not be removed. I have found that all commercial alkaline chlorides, as common salt, &c., contain as above stated a trace of sulphuric acid, either as sulphate of lime, magnesia or soda, and although this amount of sulphate may be but a small fraction of one per cent. it exerts a very injurious influence, so much so that in cases coming under my observation in which electrolysis was effected by the use of an anode and cathode separated by a thin diaphragm and commercial brine was used, from one sixth to one-fourth of the current efficiency was lost, the amount of current lost being not at all in proportion to the amount of sulphates and chlorides in the brine. By the addition to the brine of an excess of a soluble barium salt, preferably barium chloride, and the precipitation thereby of the sulphuric acid, all or approximately all of the current efficiency was obtained in the production of chlorine and caustic. I have also found that it is not necessary to treat with the precipitant all of the brine employed but only that portion which is on the anode side of the diaphragm and since the brine is not usually circulated on the anode side but only on the cathode side the treatment of only a small quantity of the whole brine used is necessary. For example in the type of cell shown in Letters Patent of the United States, numbered 450,104, dated April 7, 1891, granted to E. A. Le Sueur, I should only treat the comparatively small amount of brine used inside of the bell.

As will be obvious I do not desire to restrict myself to the use of barium salts in precipitating the trace of sulphuric acid but may use other well-known salts which completely precipitate sulphuric acid in an insoluble form.

I claim as my invention—

The improvement in the art of manufacturing chlorine and caustic alkali from brine by electrolysis which consists in first treating the brine to convert the sulphuric acid contained therein into an insoluble sulphate and then subjecting the brine to the action of an electric current, substantially as set forth.

In testimony whereof I affix my signature in presence of two witnesses.

CHARLES N. WAITE.

Witnesses:
WM. A. MACLEOD,
ROBERT WALLACE.